*Underwood & Bargis,*
*Fishing Rod.*

Nº 29,309. Patented May 18, 1858.

UNITED STATES PATENT OFFICE.

J. C. UNDERWOOD AND T. J. BARGIS, OF RICHMOND, INDIANA.

IMPROVEMENT IN TIPS FOR FISHING-RODS.

Specification forming part of Letters Patent No. 20,309, dated May 18, 1858.

*To all whom it may concern:*

Be it known that we, JOHN C. UNDERWOOD and THOMAS J. BARGIS, of Richmond, in the county of Wayne and State of Indiana, have invented a new and useful Improvement in Fishing-Rods; and we hereby declare that the following is a full, clear, and exact description of the same, reference being had to the annexed drawings, making a part of this specification, in which—

Figure 1:
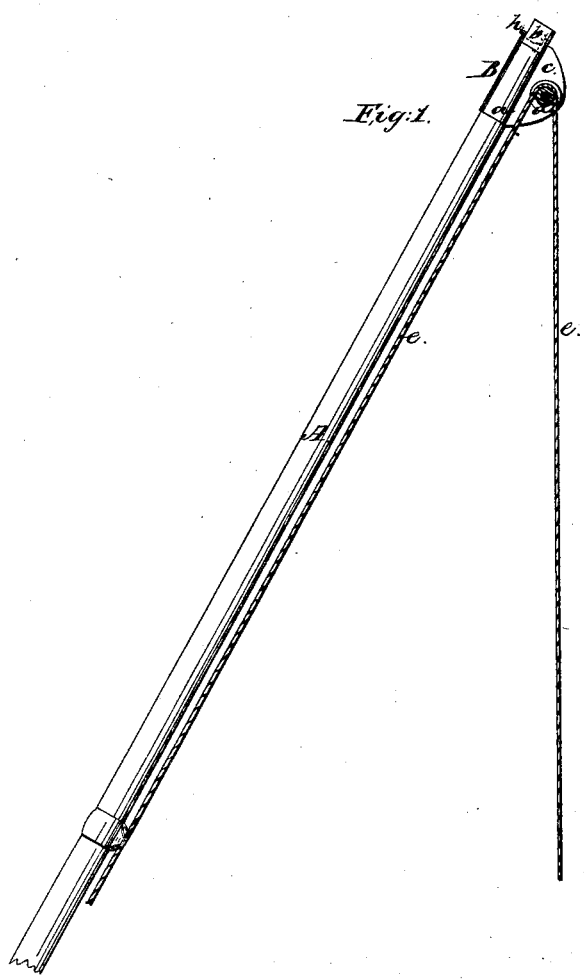
Figure 2:

Figure 1 is a longitudinal section of our improvement applied to a fishing-rod. Fig. 2 is an end view of the same.

Similar letters of reference indicate corresponding parts in the two figures.

This invention relates to an improvement in fishing-rods that have reels attached to them, and is designed to diminish the usual friction attending the running out and drawing in of the line.

The invention consists in having a small pulley attached to the tip of the pole and arranged in a peculiar way, as hereinafter described.

To enable those skilled in the art to fully understand and construct our invention, we will proceed to describe it.

A represents the tip of a fishing-rod, and $a$ is a shoulder, which is formed on its outer end to receive a socket, B, which is allowed to turn freely thereon. The end of the tip where the shoulder is formed may have a metal ferrule, $b$, fitted thereon to prevent abrasion.

The socket B is also constructed of metal, and has two jaws or plates, $c\ c$, projecting from it parallel with each other, as shown plainly in Fig. 2. The jaws or plates $c\ c$ and socket B may be formed of a single plate swaged or struck by suitable dies into proper form. The jaws or plates $c\ c$ form bearings for the axis of a pulley, $d$, the periphery of which is grooved to receive the line $e$, and the pulley $d$ is made to fit snugly between the jaws or plates, so that the line cannot wedge down or pass between the sides of the pulley and the jaws or plates $c\ c$. (See Fig. 2.)

The outer end of the socket B has a recess, $f$, made in it, said recess extending about half-way around the socket, and forming a shoulder, $g$, at each end, said shoulders forming stops for the socket and limiting its movement on the tip, the socket being allowed to turn about half a revolution on the tip. The shoulders $g$ strike against a pin, $h$, which is attached to the ferrule $b$, said pin being in the recess $f$ of the socket.

By arranging the socket B so that it may turn to a certain extent on the tip A the pulley is allowed to adjust itself either to the right or left, so that the plane of its rotation may always coincide with that of the line $e$, and by limiting the extent of the movement of socket B so that it cannot rotate entirely around the tip the line is prevented from winding around the tip.

By this improvement the line is allowed to run freely out and in, is prevented from being worn, and the line is rendered much more manageable than formerly. The invention therefore will prove valuable in "fly-fishing," as the line can be cast at will to distant places, and as no weight is used in this kind of fishing the advantage of the pulley is more apparent than in other kinds of fishing where sinkers are employed.

It may be well to remark that the ordinary tips have merely an eye for the line to run through, and the friction attending the running in and out of the line is considerable, so much so that fish are often lost, either by the chafing or cutting of the line or the difficulty attending the proper "playing" of the fish owing to the restricted movement of the line. By our improvement these difficulties are obviated.

Having thus described our invention, what we claim as new, and desire to secure by Letters Patent, is—

Attaching the pulley $d$ to the top A of the rod through the medium of the socket B, or its equivalent, so arranged that the pulley $d$ is prevented from turning entirely around the tip, and the line thereby prevented from winding around the rod, and at the same time the pulley allowed to adjust itself so that the plane of its rotation may at all times be made to coincide with that of the line $e$, substantially as and for the purpose set forth.

J. C. UNDERWOOD.
THOS. J. BARGIS.

Witnesses:
JOHN S. LYLE,
C. R. WILLIAMS.